(No Model.)
G. WESTINGHOUSE, Jr.
SYSTEM OF ELECTRICAL DISTRIBUTION.
No. 524,749. Patented Aug. 21, 1894.
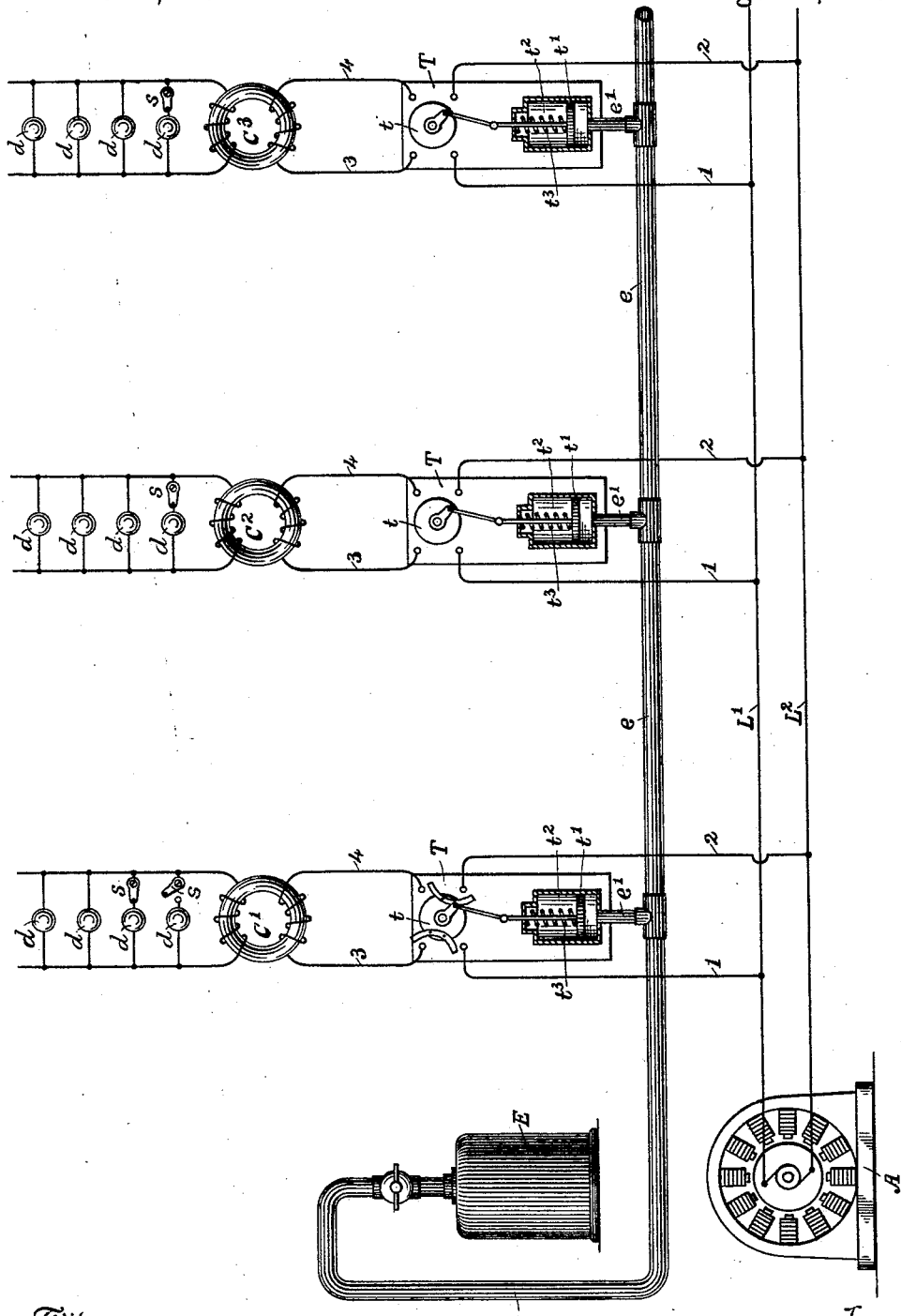
Witnesses
James W. Smith
Henry J. Albright
Inventor
George Westinghouse Jr
By his Attorney
Charles A. Terry

UNITED STATES PATENT OFFICE.

GEORGE WESTINGHOUSE, JR., OF PITTSBURG, PENNSYLVANIA.

SYSTEM OF ELECTRICAL DISTRIBUTION.

SPECIFICATION forming part of Letters Patent No. 524,749, dated August 21, 1894.

Application filed June 16, 1890. Serial No. 355,539. (No model.)

*To all whom it may concern:*

Be it known that I, GEORGE WESTINGHOUSE, Jr., a citizen of the United States, residing in Pittsburg, in the county of Allegheny and State of Pennsylvania, have invented a new and useful Improvement in Systems of Electrical Distribution, (Case No. 358,) of which the following is a specification.

The invention relates to an organization of apparatus employed for cutting electrical converters into and out of circuit as required. And also for making and breaking at distant points the circuit-connections of any desired system of electrical distribution, such for instance as electric light systems in which the lamps are not employed in connection with converters.

In operating extended systems of electrical distribution, and especially in those employing secondary generators or converters it is sometimes desirable, when a large number of converters are to be operated, that means be employed for cutting certain of the converters out of circuit when idle or when no work is being done in their secondary circuits, for there is always more or less leakage through the primary coils of a converter and whatever current is thus allowed to flow through a converter when no work is being done is wasted. At certain hours in the day the lights in certain localities are uniformly extinguished. The converters supplying these lights may, therefore, be all cut out of circuit during such times.

The object of the invention is to so organize a system that some of the converters may be cut out of and into circuit as required.

An application of the invention will be described in connection with the accompanying drawing, illustrating diagrammatically the general organization of the parts.

Referring to the figure, A represents any suitable source of alternating, intermittent or pulsatory electric currents, and L′, L², its main line conductors. Converters C′, C², &c., are illustrated as having their primaries adapted to be connected in multiple between the lines L′, L². The secondary coils of these converters supply translating devices *d*, which may be cut into and out of circuit by means of the switches *s* for instance.

Many different means for cutting the converters into and out of circuit may be employed. For convenience I have illustrated a pneumatic or hydraulic apparatus. A suitable source of compressed air is represented at E. Compressed fluid such as a non-freezing oil may be employed. A pipe *e* leads from this source into the immediate vicinity of the several converters or to points where their circuits are derived from the main line conductors L′, L². Connections with any converter, C′ for instance, are completed through a circuit controlling device *t*, the position of which with reference to its contact-points is controlled by the pressure exerted upon a piston or plate *t′*, moving within a chamber $t^2$. A spring $t^3$ normally tends to force the piston in such direction as to cause the switch *t* to break the connections between the conductors 1 and 2 leading from the main line conductors L′, L², and conductors 3 and 4 leading to the converter. This spring may be adjusted to respond to any required degree of pressure exerted upon the opposite side of the piston. A pipe *e′* leads from the pipe *e* to each device T.

The springs in different devices or groups of the same may be adjusted to different degrees of pressure, so that a pressure of, say twenty-five pounds, in a certain series of devices will cause the circuit controlling apparatus to operate and cut out of circuit the corresponding converters. Another series may respond to, say fifty pounds pressure. In this way the converters which are supplying certain lamps which are extinguished at, say nine o'clock are cut out of circuit at the proper time. Another group may be extinguished at ten o'clock, and these may, therefore, be cut out by fifty pounds pressure. This plan of operation may be extended through as many groups or classes as is desired.

The invention has been described particularly in connection with a system of electric converters, but it will be understood that it may be employed in precisely the same manner for cutting arc lamps or other devices into and out of circuit at will. In constructing a system of this character, the pipes for conveying the air or fluid under pressure may be laid at the same time with other systems of pipes, or, in the case of underground work, at the same time the electrical mains or conduits are laid.

I claim as my invention—

1. The combination with a series of electric converters and a circuit for supplying the primary coils thereof, of circuit-controlling devices applied to the respective primary coils for opening and closing the circuit connections thereof, and fluid pressure devices for operating said circuit-controlling devices, substantially as described.

2. The combination with a series of converters and circuit-controlling devices applied to the primary coils of certain of said converters and fluid-pressure devices for operating said circuit-controlling devices, certain of the same responding to different degrees of pressure from others, substantially as described.

3. The combination of a main circuit, a series of derived circuits, circuit controlling devices applied to the derived circuits, and fluid pressure devices for operating said circuit-controlling devices, certain of the same responding to different degrees of pressure from the others, substantially as described.

4. The combination with the main circuit of a system of electrical distribution and current consuming devices supplied with current therefrom, of circuit-controlling devices for cutting the current-consuming devices into and out of circuit and fluid-pressure devices for operating the circuit-controlling devices, certain of the same responding to different degrees of pressure from the others, substantially as described.

In testimony whereof I have hereunto subscribed my name this 11th day of June, A. D. 1890.

GEO. WESTINGHOUSE, Jr.

Witnesses:
W. D. UPTEGRAFF,
CHARLES A. TERRY.